United States Patent
Fukuda et al.

(10) Patent No.: US 12,221,774 B2
(45) Date of Patent: Feb. 11, 2025

(54) OPERATION RECORD ANALYSIS SYSTEM FOR CONSTRUCTION MACHINE

(71) Applicant: HITACHI CONSTRUCTION MACHINERY CO., LTD., Tokyo (JP)

(72) Inventors: Yoshibumi Fukuda, Tokyo (JP); Takuya Naka, Tokyo (JP); Masatsugu Arai, Tsuchiura (JP); Koutarou Masuda, Tsuchiura (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 391 days.

(21) Appl. No.: 17/760,887

(22) PCT Filed: Sep. 1, 2020

(86) PCT No.: PCT/JP2020/033071
§ 371 (c)(1),
(2) Date: Mar. 16, 2022

(87) PCT Pub. No.: WO2021/059892
PCT Pub. Date: Apr. 1, 2021

(65) Prior Publication Data
US 2022/0349154 A1 Nov. 3, 2022

(30) Foreign Application Priority Data
Sep. 26, 2019 (JP) .................. 2019-174920

(51) Int. Cl.
*E02F 9/26* (2006.01)
(52) U.S. Cl.
CPC .............. *E02F 9/261* (2013.01); *E02F 9/264* (2013.01)
(58) Field of Classification Search
CPC .................. E02F 9/261; E02F 9/264
See application file for complete search history.

(56) References Cited

U.S. PATENT DOCUMENTS 9,852,475 B1* 12/2017 Konrardy ......... G08G 1/096725
2007/0291130 A1* 12/2007 Broggi .................. H04N 23/90
348/E13.015

(Continued)

FOREIGN PATENT DOCUMENTS

CN 109072589 A 12/2018
JP 2010-198519 A 9/2010

(Continued)

OTHER PUBLICATIONS

International Search Report of PCT/JP2020/033071 dated Oct. 27, 2020.

(Continued)

*Primary Examiner* — Ramsey Refai
(74) *Attorney, Agent, or Firm* — MATTINGLY & MALUR, PC

(57) ABSTRACT

An operation record analysis system for a construction machine is provided which can efficiently extract work contents that may possibly make a factor of decrease in the operation rate from within operation information recorded at the time of operation of a construction machine. The operation record analysis system for a construction machine includes an object sensor that senses an object existing around a machine body. A controller calculates the position of the object on the basis of the information from the object sensor, decides, on the basis of the information from a machine body position sensor and a machine body posture sensor, and the position of the object, whether or not the machine body and the object are close to each other, and adds a result of the decision to the operation information.

7 Claims, 15 Drawing Sheets

(56) References Cited

U.S. PATENT DOCUMENTS

| | | | | |
|---|---|---|---|---|
| 2014/0303827 A1* | 10/2014 | Dolgov | ................. | B60W 30/00 |
| | | | | 701/23 |
| 2015/0149017 A1* | 5/2015 | Attard | ............. | B60W 30/18163 |
| | | | | 701/23 |
| 2016/0176338 A1 | 6/2016 | Husted et al. | | |
| 2017/0297581 A1* | 10/2017 | Hatfield | ............... | G05D 1/0061 |
| 2020/0032489 A1 | 1/2020 | Yamazaki et al. | | |

FOREIGN PATENT DOCUMENTS

| | | |
|---|---|---|
| JP | 2011-028729 A | 2/2011 |
| JP | 2016-003462 A | 1/2016 |
| JP | 6144373 B2 | 6/2017 |
| JP | 2018-112065 A | 7/2018 |

OTHER PUBLICATIONS

International Preliminary Report received in corresponding International Application No. PCT/JP2020/033071 dated Apr. 7, 2022.
Extended European Search Report received in corresponding European Application No. 20867825.0 dated Jul. 28, 2023.
Chinese Office Action received in corresponding Chinese Application No. 202080062632.4 dated Aug. 15, 2024.

* cited by examiner

OPERATION RECORD ANALYSIS SYSTEM FOR CONSTRUCTION MACHINE

TECHNICAL FIELD

The present invention relates to a system that analyzes operation records of a construction machine such as an excavator that works in a mine or the like in order to efficiently grasp a work situation of the construction machine.

BACKGROUND ART

As a background art of the present technical field, Patent Document 1 is available. Patent Document 1 describes: "an excavator, an excavator management system, and a portable communication terminal that make more particular management of the excavator at a work site possible can be provided."

In a conventional operation record analysis system, a work contents estimation section estimates work contents on the basis of operation state information outputted from an operation state information acquisition section. The work contents indicate a type of a work such as excavating, earth-removing, or traveling of the excavator. Such work contents are associated with work position information indicative of the position of the excavator and work height information indicative of the height at which the excavator is excavating, and the resulting information is recorded into a recording device, recorded into an external server through a communication device, or displayed on a display device at fixed intervals of time. This makes it possible to grasp at which time a work of what contents is being performed and perform more particular management of the excavator at the work site.

PRIOR ART DOCUMENT

Patent Document

Patent Document 1: JP-6144373-B

SUMMARY OF THE INVENTION

Problem to be Solved by the Invention

In a work in which an excavator is used, there is the possibility that part of the excavator may contact a different worker when the other worker enters an operation range of the arm of the excavator or the vicinity of a swing range of the upper swing structure. If such an event as just described should occur, then since it is necessary to stop the entire construction including a work performed by the other construction machine and perform elucidation of the cause, planning, application, and confirmation of a countermeasure and so forth, the operation rate of the excavator decreases. Accordingly, it is necessary for a manager of the work to manage the overall work such that an event that leads to a decrease in operation rate does not occur. Where the conventional operation record analysis system is used, it is possible to record work contents into a recording device, an external server, or the like. However, data to be recorded includes work contents that may possibly make a factor of decrease in the operation rate and other work contents, and generally the occurrence possibility of the former is very low. Further, the amount of data to be recorded becomes huge depending upon the length of the operation time period in the overall work, the quantity of construction machines to be used, and so forth. In order for a system user to sense and extract only work contents that may possibly make a factor of decrease in the operation rate from within such a huge amount of data as described above, much time is required, and overlooking sometimes occurs.

The present invention has been made in view of such a problem as described above, and the object of the present invention resides in provision of an operation record analysis system for a construction machine that can efficiently extract work contents that may possibly make a factor of decrease in the operation rate from within operation information recorded at the time of operation of the construction machine.

Means for Solving the Problem

In order to achieve the object described above, according to the present invention, there is provided an operation record analysis system for a construction machine that includes a machine body position sensor that senses a position of a machine body, a machine body posture sensor that senses a posture of the machine body, an operation state sensor that senses an operation state of the machine body, and a controller configured to calculate a work position of the machine body on the basis of information from the machine body position sensor and the machine body posture sensor, estimate work contents of the machine body on the basis of the work position and the operation state, and output operation information including the work position and the work contents, wherein the operation record analysis system comprises an object sensor that senses an object existing around the machine body, and the controller is configured to calculate a position of the object on the basis of information from the object sensor, decide, on the basis of the information from the machine body position sensor and the machine body posture sensor and the position of the object, whether or not the machine body and the object are close to each other, and add a result of the decision to the operation information and output the operation information.

According to the present invention configured in such a manner as described above, since a decision result of whether or not the machine body and the object existing around the machine body are close to each other is included in the operation information, a system user can quickly extract the work contents when the machine body and the object existing around the machine body are close to each other from within a huge amount of operation information. Thus, this makes it possible to improve the verification efficiency of the work situation of a construction machine.

Advantages of the Invention

According to the operation record analysis system for a construction machine according to the present invention, it is possible to efficiently extract work contents that may possibly make a factor of decrease in the operation rate from within operation information recorded at the time of operation of the construction machine.

MODES FOR CARRYING OUT THE INVENTION

Figure 1:
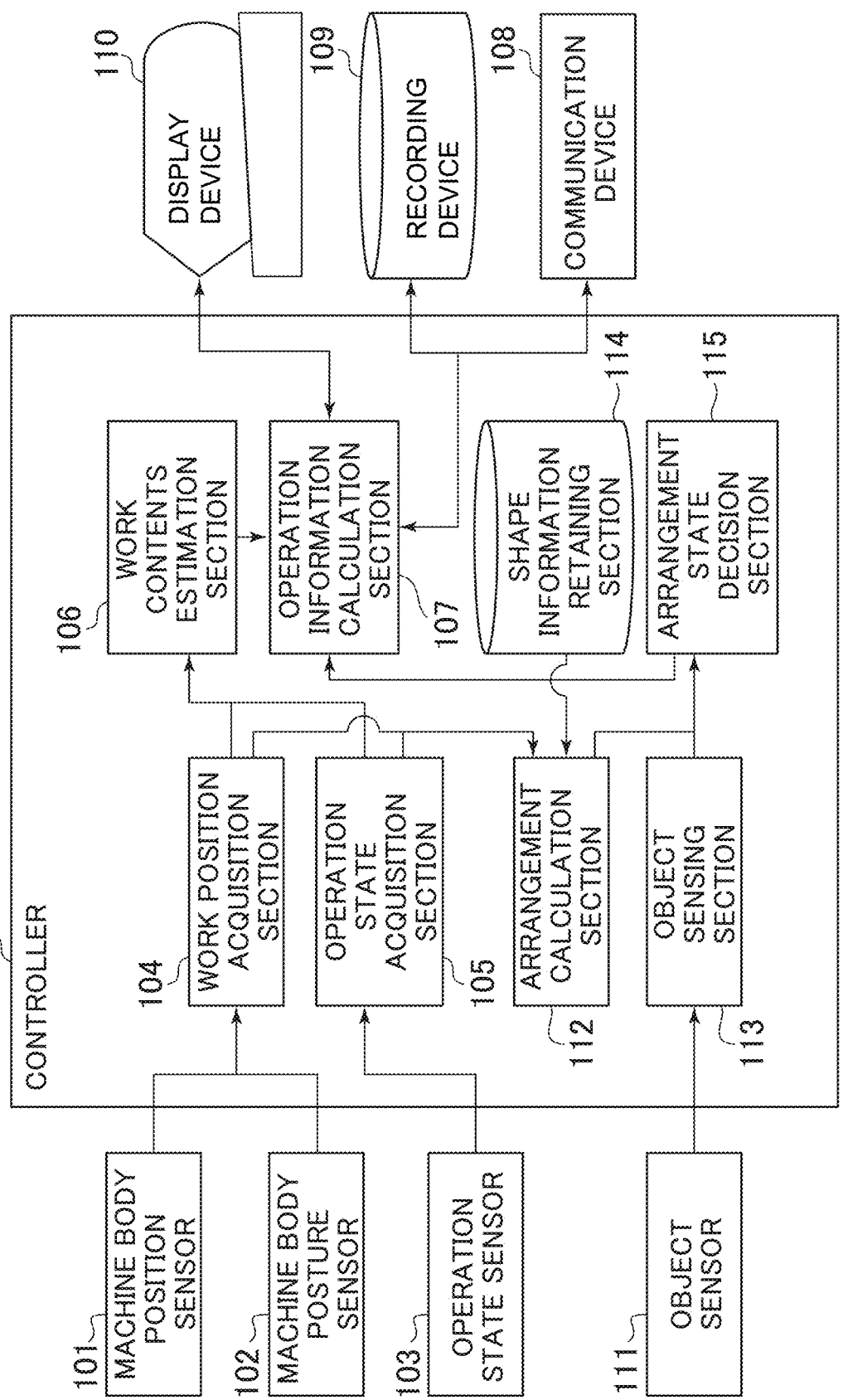
FIG. 1 is a block diagram of an operation record analysis system for a construction machine.

In the following, embodiments of the present invention are described with reference to the drawings. It is to be noted that, in the drawings, like members are denoted by like reference characters, and overlapping description of them is suitably omitted

First Embodiment

In the present embodiment, an example of an operation record analysis system for a construction machine in which contents that meet conditions are extracted from within operation records and are displayed preferentially.

FIG. 1 is a block diagram of the operation record analysis system for a construction machine of the present embodiment. Here, description is given taking an excavator as a target construction machine.

A machine body position sensor 101 is configured, for example, from a GPS device or a GNSS device, and senses the position of the excavator and sends out a result of the sensing.

A machine body posture sensor 102 is configured from angle sensors for sensing angles of a boom, an arm, and a bucket, an angle sensor for sensing a swing angle of an upper swing structure and so forth, and senses a positional relation between a lower track body and the upper swing structure of the excavator, a positional relation among the boom, arm, and bucket and so forth and sends out a result of the sensing.

An operation state sensor 103 is configured from a rotation speed sensor for sensing an engine speed, a pressure sensor for sensing a load pressure of an actuator, and so forth, and acquires a state relating to operation of the excavator such as output power of the engine, movable part hydraulic pressures, and so forth, and sends out resulting acquired state information.

An work position acquisition section 104 acquires a place at which the excavator is working and a positional relation between and states of the movable parts of the excavator on the basis of information received from the machine body position sensor 101 and the machine body posture sensor 102, and sends out resulting acquired information.

An operation state acquisition section 105 acquires a state of the engine and a state of a hydraulic system on the basis of information received from the operation state sensor 103, and sends out resulting acquired state information.

An work contents estimation section 106 performs such estimation of which one of, for example, excavation, earth removal and travel the work being currently performed by the excavator is on the basis of information received from the work position acquisition section 104 and the operation state acquisition section 105, and sends out resulting estimated work contents.

An operation information calculation section 107 integrates work contents outputted from the work contents estimation section 106 and information representative of whether or not an object existing around the excavator and the excavator are close to each other. Then, when the operation information calculation section 107 decides that they are close to each other, it adds such setting as to display this preferentially to produce operation information and sends out the resulting operation information.

A communication device 108 is, for example, a portable communication device and is configured from a wireless LAN terminal, and sends out operation information produced by the operation information calculation section 107 to an apparatus outside the system through a communication line.

A recording device 109 is configured, for example, from a memory or a disk, and records operation information outputted from the operation information calculation section 107 such that it outputs this information on the basis of a request from the operation information calculation section 107 or the communication device 108.

A display device 110 is configured, for example, from a console and a display, and displays operation information outputted from the operation information calculation section 107 on the display in response to an operation of the console.

An object sensor 111 includes cameras 501 and 502 (depicted in FIG. 3) attached to the machine body, and images states around the excavator and outputs resulting camera images.

An object sensing section 113 receives images outputted from the object sensor 111, senses an object existing around the excavator from within the images and sends out a result of the sensing.

A shape information retaining section 114 retains a three-dimensional shape of the excavator and outputs the three-dimensional shape in response to a request from an arrangement calculation section 112.

An arrangement state decision section 115 compares current three-dimensional arrangement of parts of the excavator outputted from the arrangement calculation section 112 with a result of projection in which an object sensing result in camera images outputted from the object sensing section 113 is projected from 2D to 3D to decide whether or not an object sensed by the object sensing section 113 exists in the proximity of the position at which the machine body of the excavator currently exists, and sends out a result of the decision to the operation information calculation section 107.

Examples of a display image of operation information at a point of time at which an event that may possibly make a factor of decrease in the operation rate has occurred, in the operation record analysis system for a construction machine described above, are described with reference to FIGS. 2 to 10.

Figure 2:
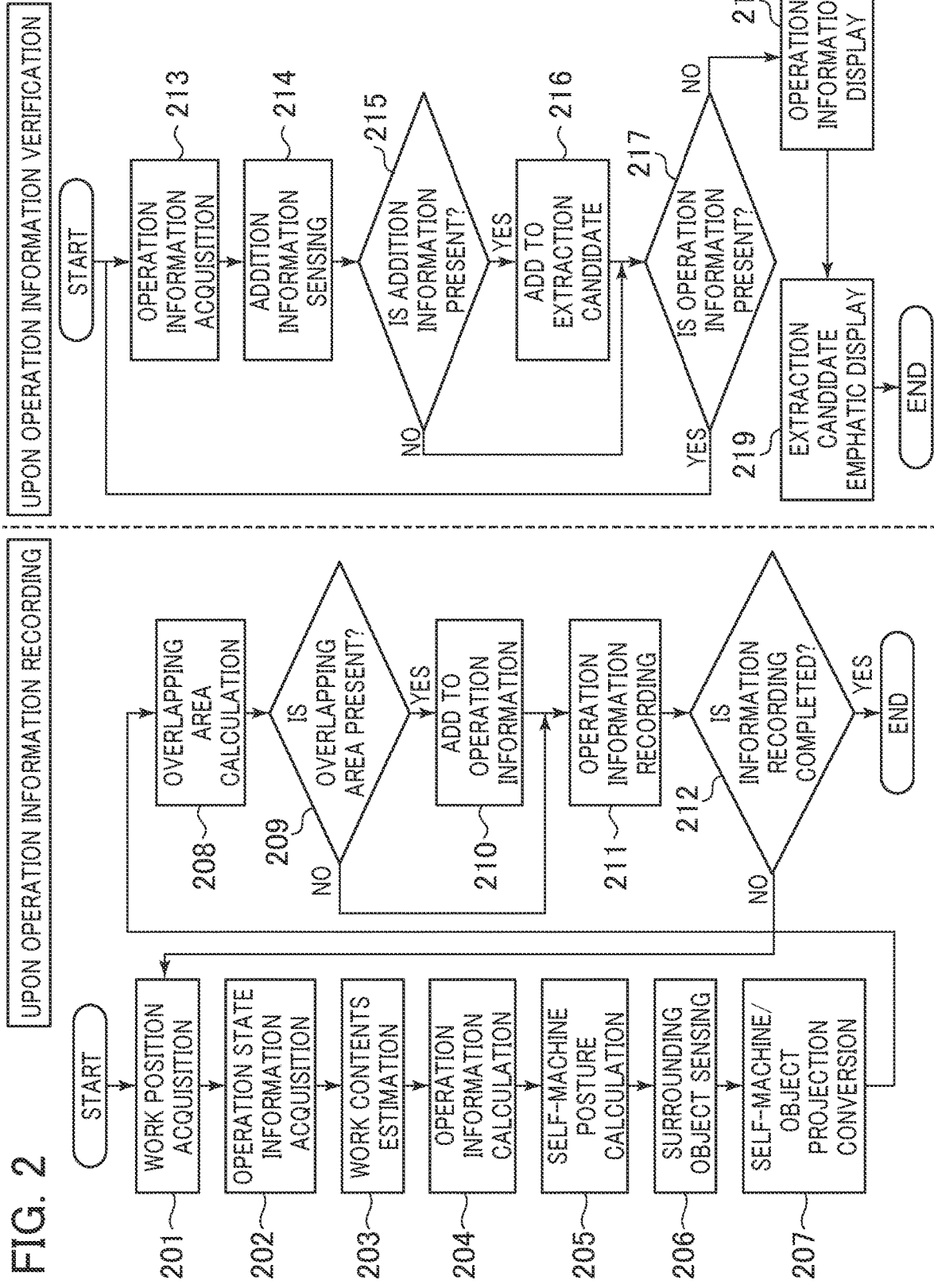
FIG. 2 is a view illustrating flows of processing in the operation record analysis system for a construction machine.

FIG. 2 depicts a flow of processing of the operation record analysis system according to the present invention. The flow of processing is roughly divided into two. In particular, the processing upon operation information recording is executed when the excavator is operating. The processing upon operation information verification is executed when operation information about the excavator recorded by the recording device 109 is verified using the display device 110.

If operation upon operation information recording is started in the operation record analysis system for a construction machine according to the present invention, then a process in step 201 is performed first.

Figure 3:
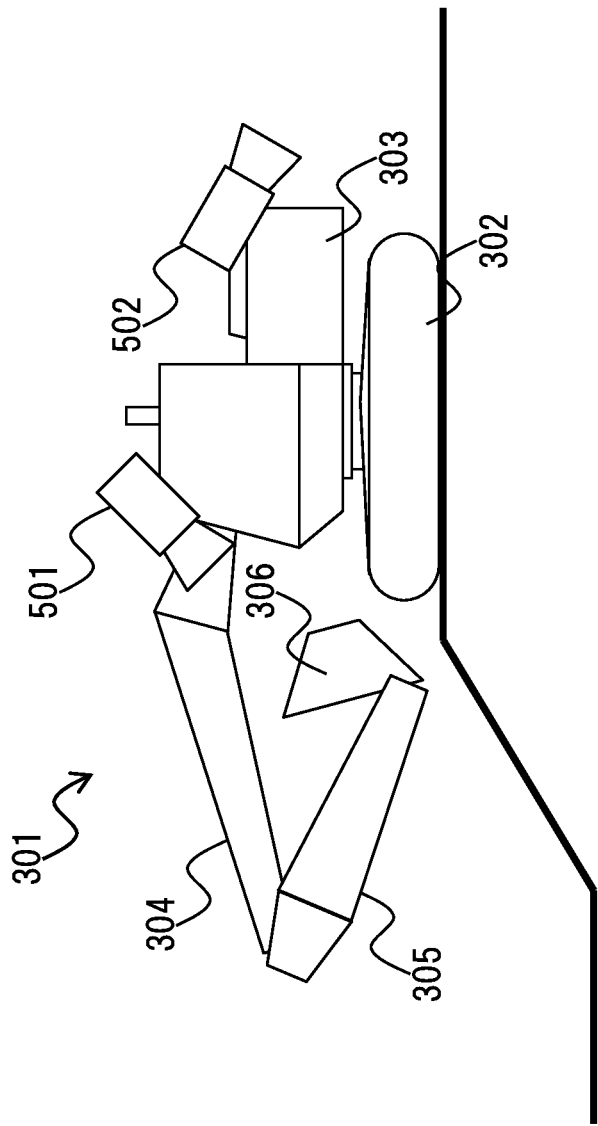
FIG. 3 is a view depicting a state of an excavator.

In step 201, the work position acquisition section 104 acquires a work position on the basis of information inputted from the machine body position sensor 101 and the machine body posture sensor 102. A state of the excavator in this example is depicted in FIG. 3. The excavator 301 includes at least a lower track body 302, an upper swing structure 303 swingably provided on the lower track body 302, and a front work implement provided on the upper swing structure 303 and including a boom 304, an arm 305, and a bucket 306. The excavator 301 exists on the ground surface having a slanting surface. The cameras 501 and 502 are attached to the machine body and image the surroundings of the machine body. The machine body position sensor 101 may use such a technique as to acquire a latitude and a longitude on the earth using, for example, the GPS (Global Positioning System). As another technique, also such a technique as to acquire a relative position in a target area of a construction plan using a total station or the like is possibly applied. The machine body posture sensor 102 senses the posture of the machine body using angle sensors and so forth mounted on the excavator 301. The posture in this case is information in which a direction of the lower track body 302, a difference in swing angle between the lower track body 302 and the upper swing structure 303 and differences in arrangement angle between portions of the upper swing structure 303, boom 304, arm 305, and bucket 306 are summarized. Thereafter, the processing advances to step 202.

In step 202, the operation state acquisition section 105 acquires an operation state on the basis of information outputted from the operation state sensor 103. The operation state sensor 103 outputs information obtained from sensors such as an engine output power sensor, a hydraulic pressure sensor, a speedometer, and an abnormality sensing sensor to the operation state acquisition section 105. Thereafter, the processing advances to step 203.

Figure 4:
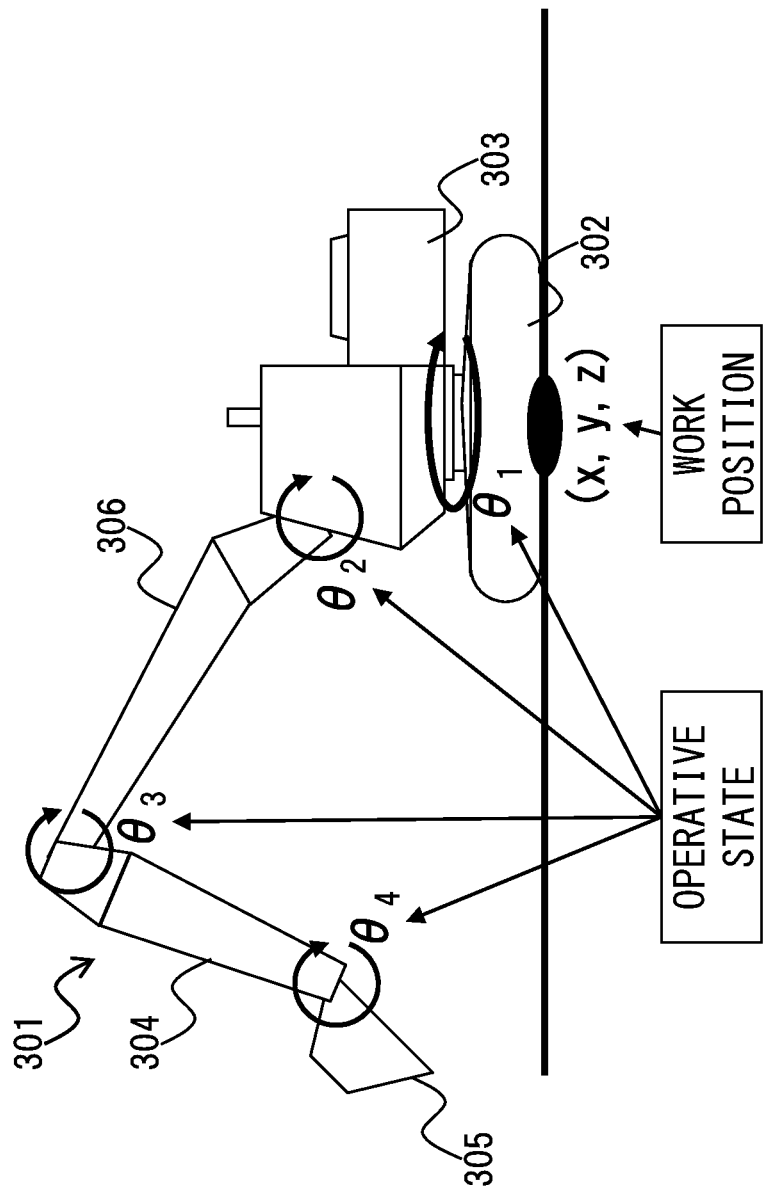
FIG. 4 is a view depicting an example of a work position and an operation state of the excavator.

In step 203, the work contents estimation section 106 estimates current work contents of the excavator on the basis of the information outputted from the work position acquisition section 104 and the operation state acquisition section 105. An example of the work position outputted from the work position acquisition section 104 and the operation state outputted from the operation state acquisition section 105 is depicted in FIG. 4. The work position here is three-dimensional coordinates of the position at which swing center on the bottom face of the excavator exists. Meanwhile, the operation state is angles θ1, θ2, θ3, and θ4 formed relatively by each of the parts of the excavator. In the estimation of the work contents, the work contents estimation section 106 estimates, on the basis of, for example, information about the posture of the machine body outputted from the machine body posture sensor 102, that the work contents are traveling when the position of the bucket 306 is higher than the ground surface and besides the value of the speedometer is equal to or higher than a fixed value. On the other hand, the work contents estimation section 106 estimates that the work contents are excavating when the angle of the bucket 306 is continuing to change and besides the delivery pressure of the hydraulic pump is equal to or higher than a fixed value. The work contents estimation section 106 outputs the work contents estimated in this manner to the operation information calculation section 107. Thereafter, the processing advances to step 204.

In step 204, the operation information calculation section 107 integrates the work contents inputted from the work contents estimation section 106 and numerical information about positions, speeds, angles, and so forth relating to the work contents. For example, in a case where it is estimated that the work contents are traveling, the operation information calculation section 107 integrates the traveling speed with the work contents. On the other hand, in a case where it is estimated that the work contents are excavating, the operation information calculation section 107 integrates angle information indicated as the posture. A result of such integration is retained in the operation information calculation section 107. Thereafter, the processing advances to step 205.

In step 205, the arrangement calculation section 112 constructs a three-dimensional shape based on the current posture of the excavator 301. The arrangement calculation section 112 receives a three-dimensional basic shape of the excavator 301 retained by the shape information retaining section 114 as an input thereto and applies, to the three-dimensional basic shape, the work position inputted from the work position acquisition section 104 and the operation state inputted from the operation state acquisition section 105. For example, the arrangement calculation section 112 updates the shape, on the basis of the information about the posture, such that the angle differences between the lower track body 302 and the upper swing structure 303, and between the parts including the boom 304, arm 305, and bucket 306 in the three-dimensional shape become equivalent according to the direction of the lower track body 302, the difference in swing angle between the lower track body 302 and the upper swing structure 303, and the differences in arrangement angle between the portions of the upper swing structure 303, boom 304, arm 305, and bucket 306. The arrangement calculation section 112 outputs a result of the update to the arrangement state decision section 115. Thereafter, the processing advances to step 206.

Figure 5:
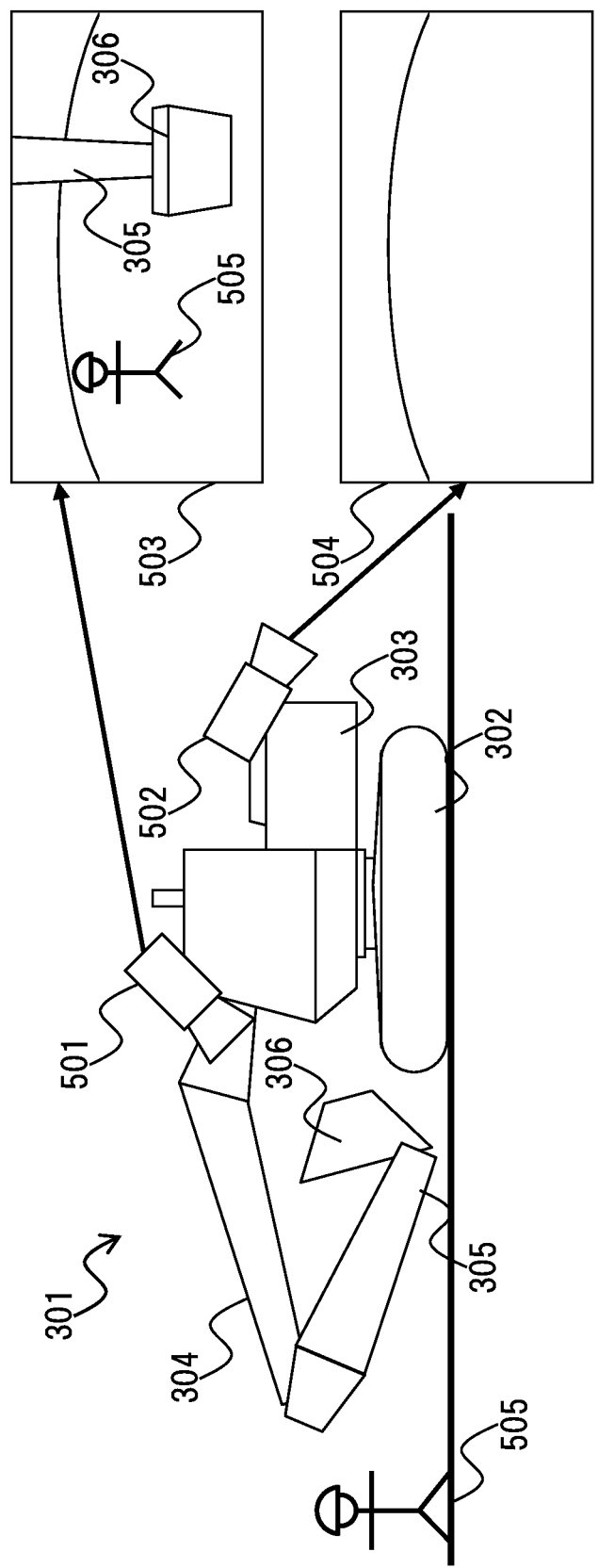
FIG. 5 is a view depicting an installation state of a camera on the excavator and a camera image.

In step 206, the object sensing section 113 performs an object sensing process using images around the excavator being captured by the cameras 501 and 502. An example of the object sensing process is depicted in FIG. 5. In this example, the front camera 501 and the rear camera 502 are incorporated on the upper swing structure 303. The images captured by the cameras 501 and 502 are such as a front camera image 503 and a rear camera image 504, respectively. Since no object exists in the rear of the excavator 301, only the ground surface and the sky are reflected in the rear camera image 504. Since a person 505 exists in front of the excavator 301, the person 505 is reflected in the front camera image 503. Further, depending upon the state of the posture of the machine body, the arm 305 and the bucket 306 are reflected in the front camera image 503.

Figure 6:
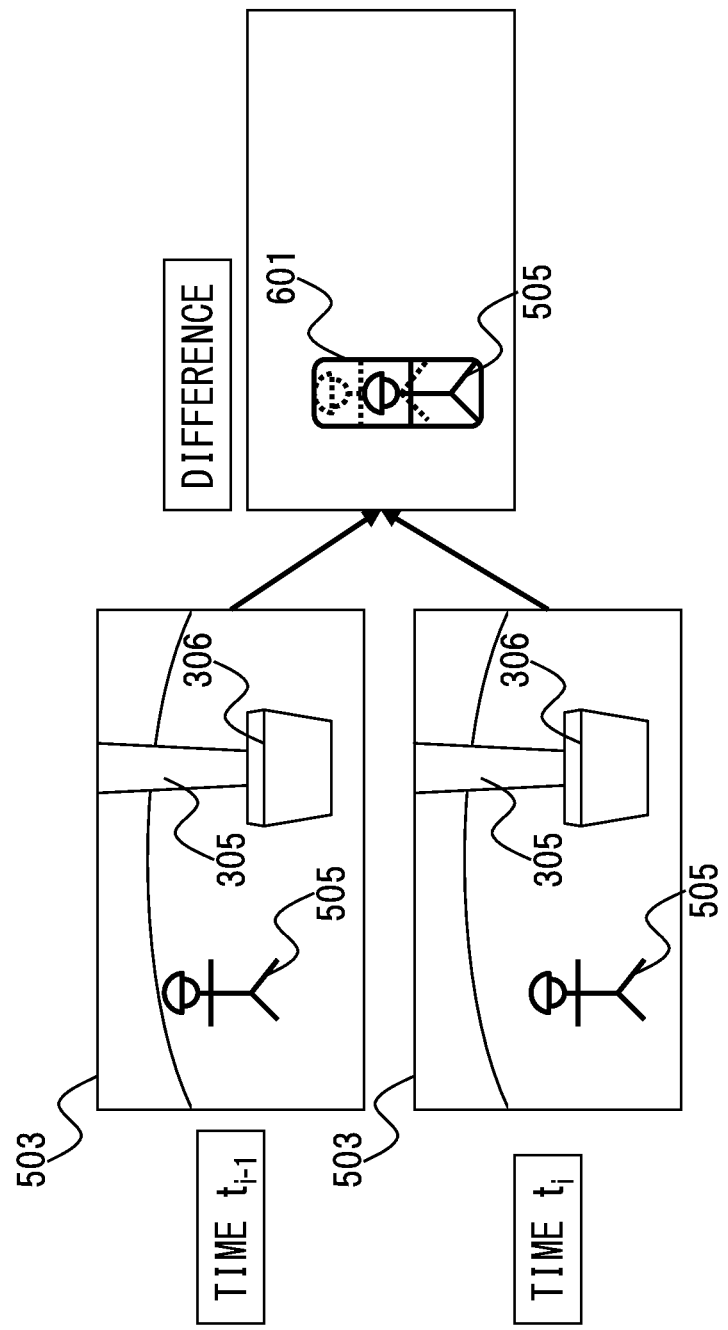
FIG. 6 is a view illustrating a process for calculating a difference area using camera images.

An example of surrounding object sensing by the front camera image 503 is depicted in FIG. 6. The front camera image 503 indicates an appearance at time ti−1 at an upper left portion in FIG. 6 and indicates an appearance at time ti after that at a lower left portion of FIG. 6. Here, the person 505 is approaching the excavator, and the image of the person 505 is moving in a downward direction in the front camera image 503 as time passes. If the difference between the front camera images 503 at time ti−1 and time ti is acquired, then such a result as depicted on the right side in FIG. 6 is obtained. In the image, a difference in image appears only at a portion at which the person 505 moves. This is referred to as difference area 601 on the image. In a case where a difference appears in this manner, the difference area 601 on the image is outputted to the arrangement state decision section 115. Thereafter, the processing advances to step 207.

Figure 7:
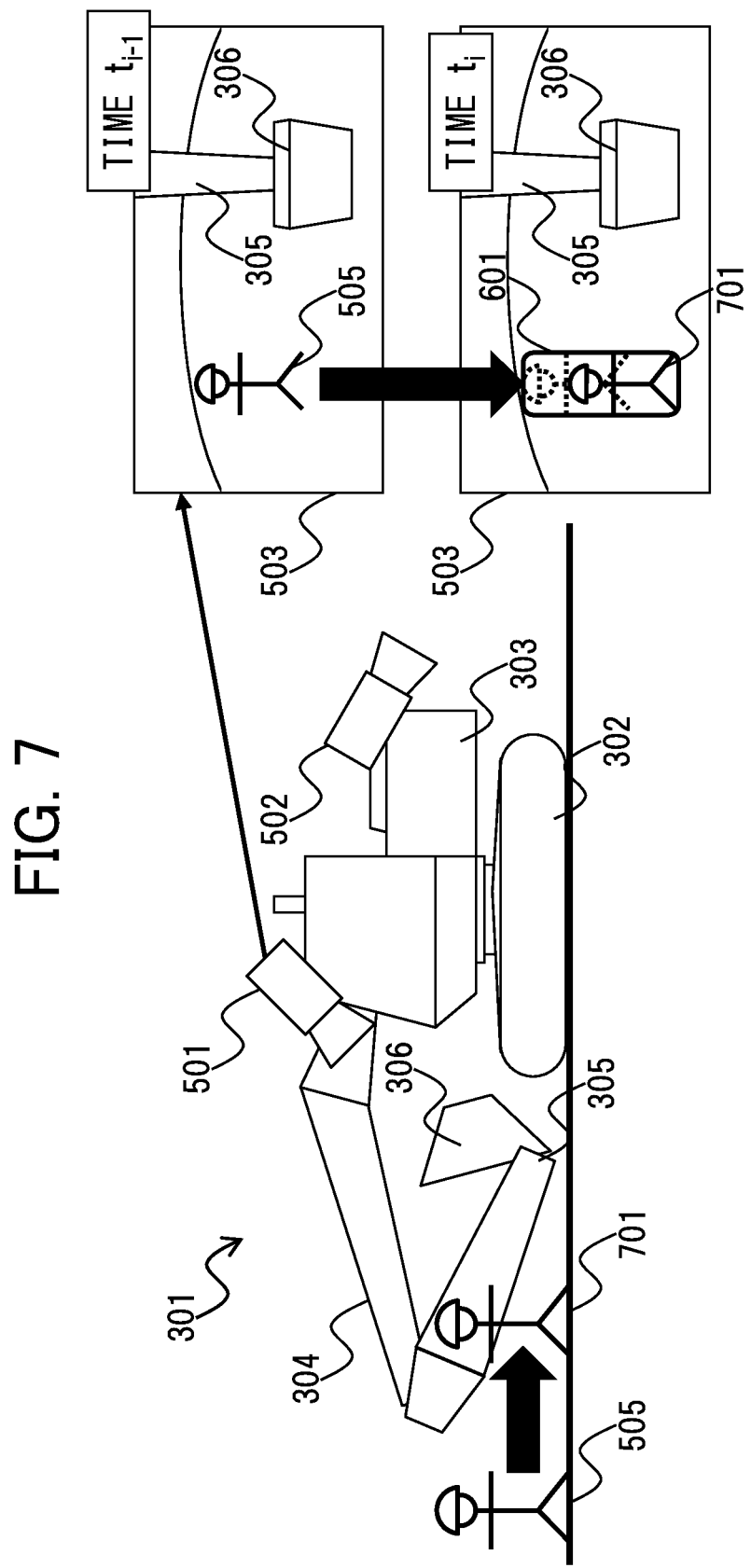
FIG. 7 is a view illustrating a process for projection transforming a difference area in a camera image.

In step 207, the arrangement state decision section 115 performs projection transformation between a coordinate system of the camera images and a coordinate system representative of the shape of the excavator 301. The camera images are represented in a two-dimensional coordinate system and the shape of the excavator 301 is represented in a three-dimensional coordinate system. The arrangement state decision section 115 performs projection transformation between them and calculates at which position the difference area 601 sensed in the camera images is positioned relative to the excavator. The shape of the excavator 301 has been updated by the process in step S205 such that it becomes equivalent to that of the current posture of the excavator 301. The shape of the excavator 301 simultaneously holds also an installation position and an imaging direction of the front camera 501. Further, also a relative positional relation between the ground surface and the front camera 501 has been known on the basis of the information about the work position. Since the person 505 exists on the ground surface, it is possible to find it by projection transformation at which position the difference area 601 sensed in the front camera image 503 exists on the ground surface in the three-dimensional space. This state is depicted in FIG. 7. By the projection transformation, the position at which a person 701 exists in the three-dimensional space at time ti is acquired. Thereafter, the processing advances to step 208.

Figure 8:
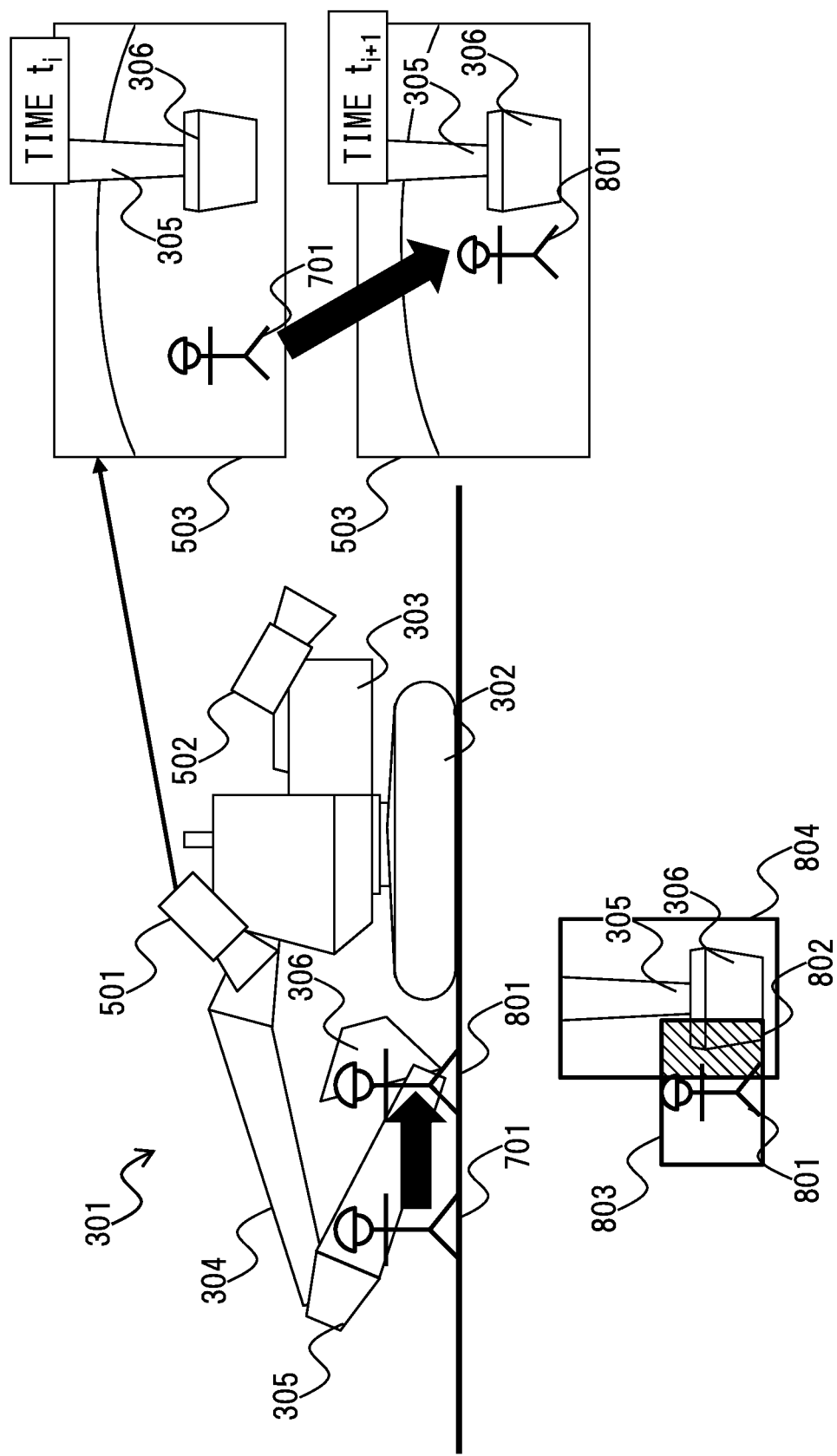
FIG. 8 is a view illustrating a process for calculating an overlapping area.

In step 208, the arrangement state decision section 115 calculates an overlapping area between the components of the excavator 301 and the person 701 at time ti. For example, a state is supposed in which time further passes from the state of FIG. 7 and the person 701 further moves. This state is depicted in FIG. 8. The person 701 at time ti has changed its position by the movement and moved to a position in the proximity of the bucket 306 as depicted by a person 801 at time ti+1. The overlapping area in this case is found in the following manner. A range in which the person 801 at time ti+1 may possibly move thereafter is calculated as a person movement range 803 in the form of a three-dimensional area. The person movement range 803 indicates a range in which the person 801 may possibly move till time ti+2 at a speed at which the person can possibly move. Similarly, a range in which the arm 305 and the bucket 306 of the excavator 301 at time ti+1 may possibly move thereafter is calculated as an excavator movement range 804 in the form of a three-dimensional area. The excavator movement range 804 indicates a range in which, where the arm 305 and the bucket 306 move while accelerating to the maximum from the speed of movement thereof at time ti+1, they may possibly move till time ti+2. The overlapping area 802 is calculated as an area (indicated by slanting lines in FIG. 8) in which the person movement range 803 and the excavator movement range 804 overlap with each other. Thereafter, the processing advances to step 209.

In step 209, the arrangement state decision section 115 decides whether or not an overlapping area 802 has appeared by the process in step 208. In a case where an overlapping area 802 has appeared, the processing advances to step 210, but in any other case, the processing advances to step 211.

In step 210, the operation information calculation section 107 adds the appeared overlapping area 802 to the operation information calculated in step 204 to produce new operation information. Thereafter, the processing advances to step 211.

In step 211, the operation information calculation section 107 records the operation information into the recording device 109. Alternatively, the operation information calculation section 107 records the operation information into an external recording device through the communication device 108. Thereafter, the processing advances to step 212.

In step S212, it is decided whether or not the recording of the operation information is completed. In a case where recording of the operation information is completed by stopping of the excavator 301 or the like, the process upon operation information recording depicted on the left side in FIG. 2 is ended, but in any other case, the processing advances to step 201. Upon operation information recording, such a process as described above is performed.

Now, a process when operation information recorded in the recording device 109 is verified is described. A flow of the process is described at a portion of the operation upon operation information verification depicted on the right side in FIG. 2.

After operation upon operation information verification is started in the operation record analysis system for a construction machine according to the present embodiment, a process in step 213 is performed first.

In step 213, the operation information calculation section 107 acquires operation information recorded in the recording device 109. Operation information at which point of time is to be acquired is set by an input from a system user using the display device 110. It is to be noted that the operation information to be acquired may be operation information at a certain point of time or may be a range designated from within operation information at a plurality of consecutive points of time. Where a range is designated, processes upon operation information verification are executed consecutively within the range. Thereafter, the processing advances to step 214.

In step 214, addition information added to the acquired operation information is sensed. In a case where no addition information is added, nothing is sensed. Thereafter, the processing advances to step 215.

In step 215, it is decided whether or not the acquired operation information has addition information added thereto. In a case where addition information is added, the processing advances to step 216, but in any other case, the processing advances to step 217.

In step 216, the acquired operation information is added to an extraction candidate. Thereafter, the processing advances to step S217.

In step 217, it is decided whether or not operation information to which the process described above is not applied as yet remains in the operation information designated by the display device 110. In a case where such operation information remains, the processing advances to step 213, but in any other case, the processing advances to step 218.

In step 218, the acquired operation information is displayed on the display device 110. Thereafter, the processing advances to step 219.

In step 219, the operation information added to the extraction candidate is highlighted. Thereafter, the process is ended.

Figure 9:
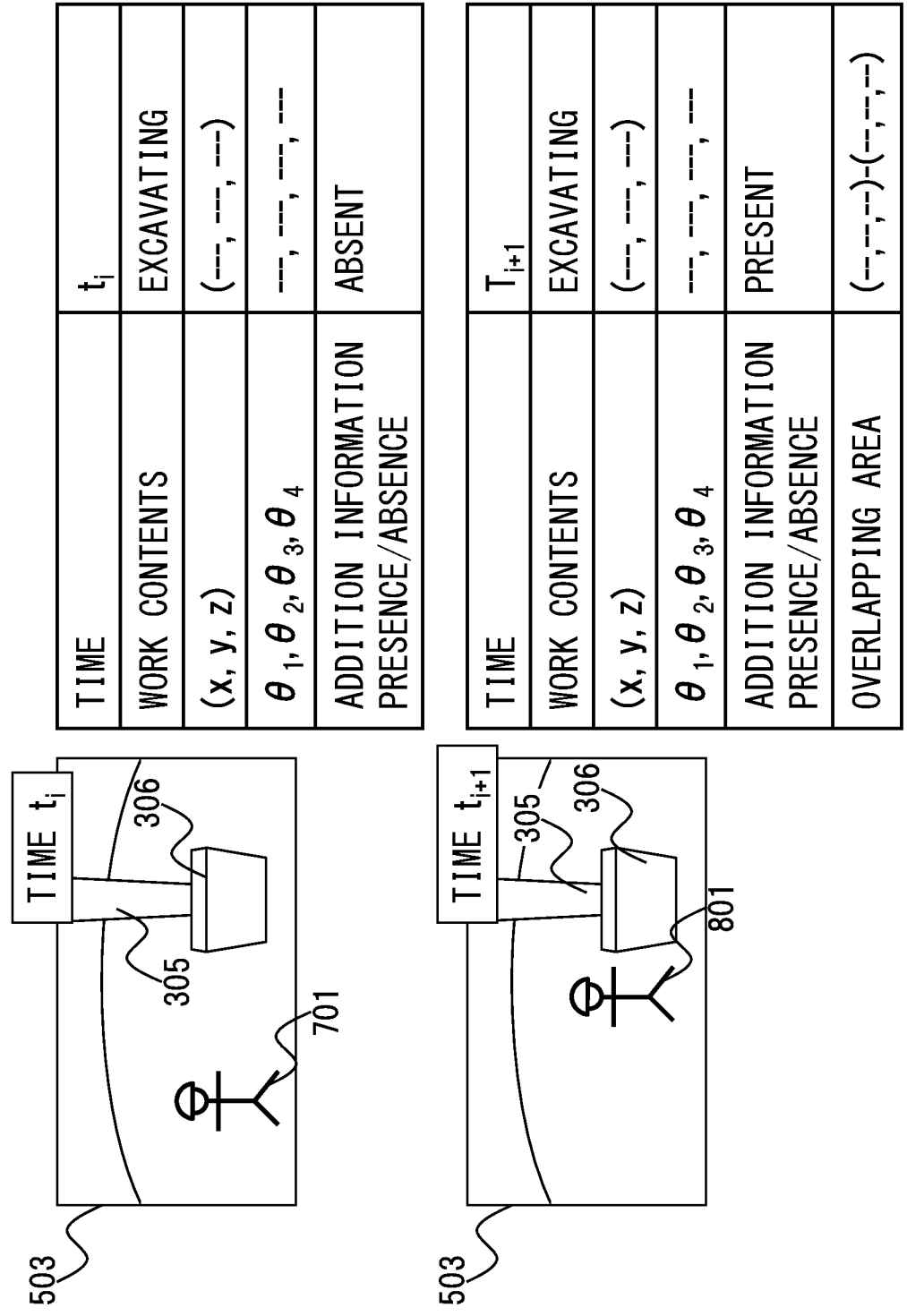
FIG. 9 is a view depicting an example of operation information.

Here, an example of the operation information is depicted in FIG. 9. Here, operation information at time ti and operation information at time ti+1 are depicted. At time ti, the work contents of the excavator 301 are "excavating," and the position and the posture of the excavator 301 are recorded in the operation information. At this point of time, the overlapping area 802 does not appear as yet, and therefore, the addition information is set to "absent." At time ti+1, the work contents of the excavator 301 are "excavating," and the position and the posture of the excavator 301 are recorded as the operation information. At this pint of time, the person 701 exists at such a position as indicated as a person 801 at time ti+1 as a result of movement thereof, and as a result of the overlapping area calculation process, an overlapping area 802 is calculated. On the basis of this result, the addition information is set to "present" and the overlapping area 802 is added as addition information to the operation information.

Figure 10:
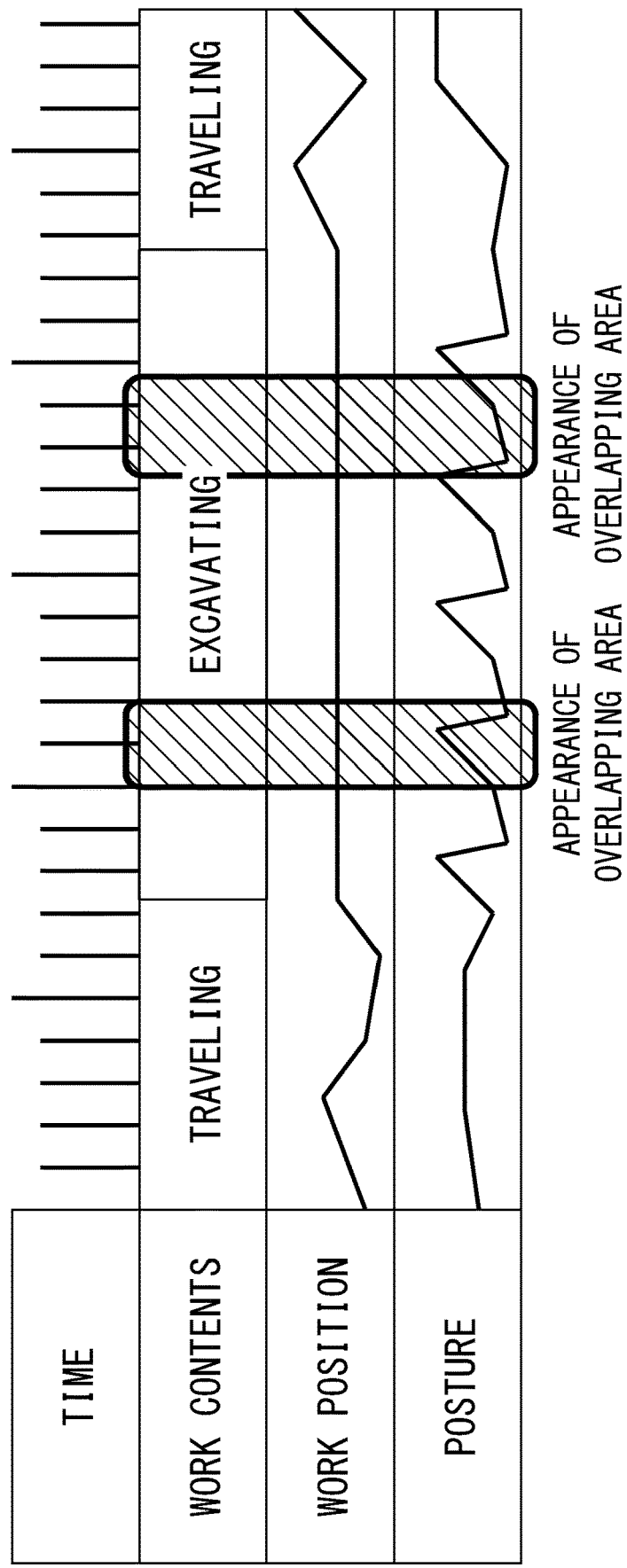
FIG. 10 is a view depicting display contents of a display device in a first embodiment of the present invention.

Now, an example of the highlighting in step 218 is depicted in DIF. 10. In this example, such a graph as depicted in FIG. 10 is displayed on the display screen of the display device 110. In the graph, the axis of abscissa indicates transition of time. In the row of the work contents, a change in work contents associated with transition of time is indicated. In the row of the work position, a change in work position is indicated similarly. Here, although this figure indicates a graph displayed by one line for the convenience of illustration, actually, a graph that indicates a change in three-dimensional coordinates, a change in latitude and longitude, or the like is displayed. In the row of the posture, a change in posture of the excavator 301 is indicated. Also here, although a graph is displayed as one line for the convenience of illustration, a change in angle such as θ1, θ2, θ3, or θ4 is displayed by a graph. That the overlapping area 802 exists at time at which an overlapping area 802 added to operation information exists is indicated by a display image of a belt (indicated by slanting lines in FIG. 10) and characters of "appearance of overlapping area." Consequently, an approaching state of the excavator 301 and the excavator 301, which may possibly become a factor of operation rate decrease in the excavator 301, is indicated clearly in display images of operation information at a plurality of points of time.

In the present embodiment, in the operation record analysis system for a construction machine that includes the machine body 301 including the front work implement having at least the arm 305 and the bucket 306, the machine body position sensor 101 that senses a position of the machine body 301, the machine body posture sensor 102 that senses a posture of the machine body 301, the operation state sensor 103 that senses an operation state of the machine body 301, and the controller 100 that calculates a work position of the machine body 301 on the basis of information from the machine body position sensor 101 and the machine body posture sensor 102, estimates work contents of the machine body 301 on the basis of the work position and the operation state and outputs operation information including the work position and the work contents, the operation record analysis system includes the object sensor 111 that senses the object 505, 701, 801 existing around the machine body 301, and the controller 100 calculates a position of the object 505, 701, 801 on the basis of the information from the object sensor 111, decides on the basis of the information from the machine body position sensor 101 and the machine body posture sensor 102 whether or not the machine body 301 and the object 505, 701, 801 are close to each other, and adds a result of the decision to the operation information and outputs the operation information.

According to the present embodiment configured in such a manner as described above, since a decision result of whether or not the machine body 301 and the person 505, 701 or 801 existing around the machine body 301 are close to each other is included in the operation information, a system user can quickly extract work contents when the machine body and an object existing the machine body are close to each other from within a huge amount of operation information. This makes it possible to improve the verification efficiency of the work situation of the excavator 301.

Further, the object sensor 111 is the camera 501, 502 that captures an image around the machine body 301, and the controller 100 decides that the machine body 301 and the object 801 are close to each other in a case where at least part of the machine body movement range 804 in which the machine body 301 may possibly move in the image capturing interval of the camera 501, 502 and at least part of the object movement range 803 in which the object 801 may possibly move in the image capturing interval overlap with each other. This makes it possible to decide, on the basis of the moving speeds of the excavator 301 and the object 801, whether or not the excavator 301 and the object 801 come close to each other.

Further, the operation record analysis system for a construction machine in the present embodiment further includes the communication device 108 that transmits the operation information, the recording device 109 that records the operation information, and the display device 110 that displays the operation information. This improves the degree of freedom of the place at which the operation information is to be confirmed.

Second Embodiment

The present embodiment described below is directed to an example in which, where an overlapping area 802 appears, a factor that causes the overlapping area 802 is displayed.

Figure 11:
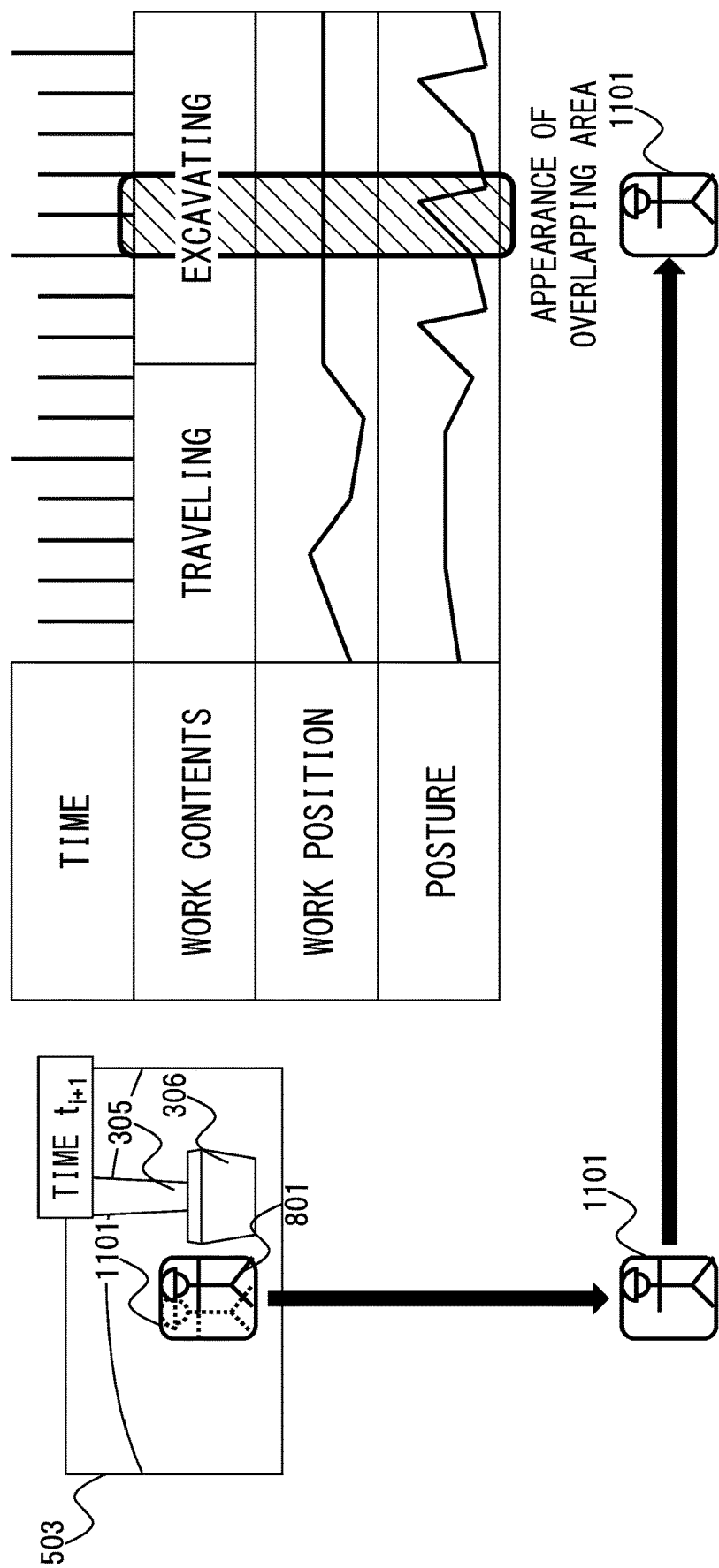
FIG. 11 is a view depicting display contents of a display device in a second embodiment of the present invention.

An example of the front camera image 503 at time ti+1 in the present embodiment is depicted at an upper left portion in FIG. 11. Here, a difference area 1101 at time t1+1 appears as a result of a movement of the person 801 at time ti+1. In a case where it is decided, by a process after this, that an overlapping area 802 has appeared, the difference area 1101 at time ti+1 is recorded into the recording device 109. Since, where an overlapping area 802 appears, also the difference area 1101 exists, in such a situation as just described, the difference area 1101 is recorded into the recording device 109 without fail.

An example of a display image on the screen of the display device 110 in this example is depicted on the right side in FIG. 11. At time at which the overlapping area 802 exists, the difference area 1101 recorded in the recording device 109 is displayed together with a highlighted image of appearance of an overlapping area.

In the present embodiment, the controller 100 places, when deciding that the excavator 301 and the object 801 are close to each other, the difference area 1101 indicative of a range in which the object 801 has moved in an imaging interval of the cameras 501 and 502 from within the images captured by the cameras 501 and 502 at the time of decision, into the operation information and outputs the operation information.

According to the present embodiment configured in such a manner as described above, when an overlapping area 802 appears, the difference area 1101 that has been made a decision criterion of the appearance can be displayed as an image, and the system user can visually recognize what object has caused the overlapping area 802 to be appeared. The system user can grasp the significance of analysis of the overlapping area 802 on the basis of the visually recognized contents and execute subsequent countermeasures rapidly.

Third Embodiment

The present embodiment described below is directed to an example in which, in a case where an overlapping area 802 appears, a factor that causes the overlapping area 802 to be appeared is displayed including also some other state.

Figure 12:
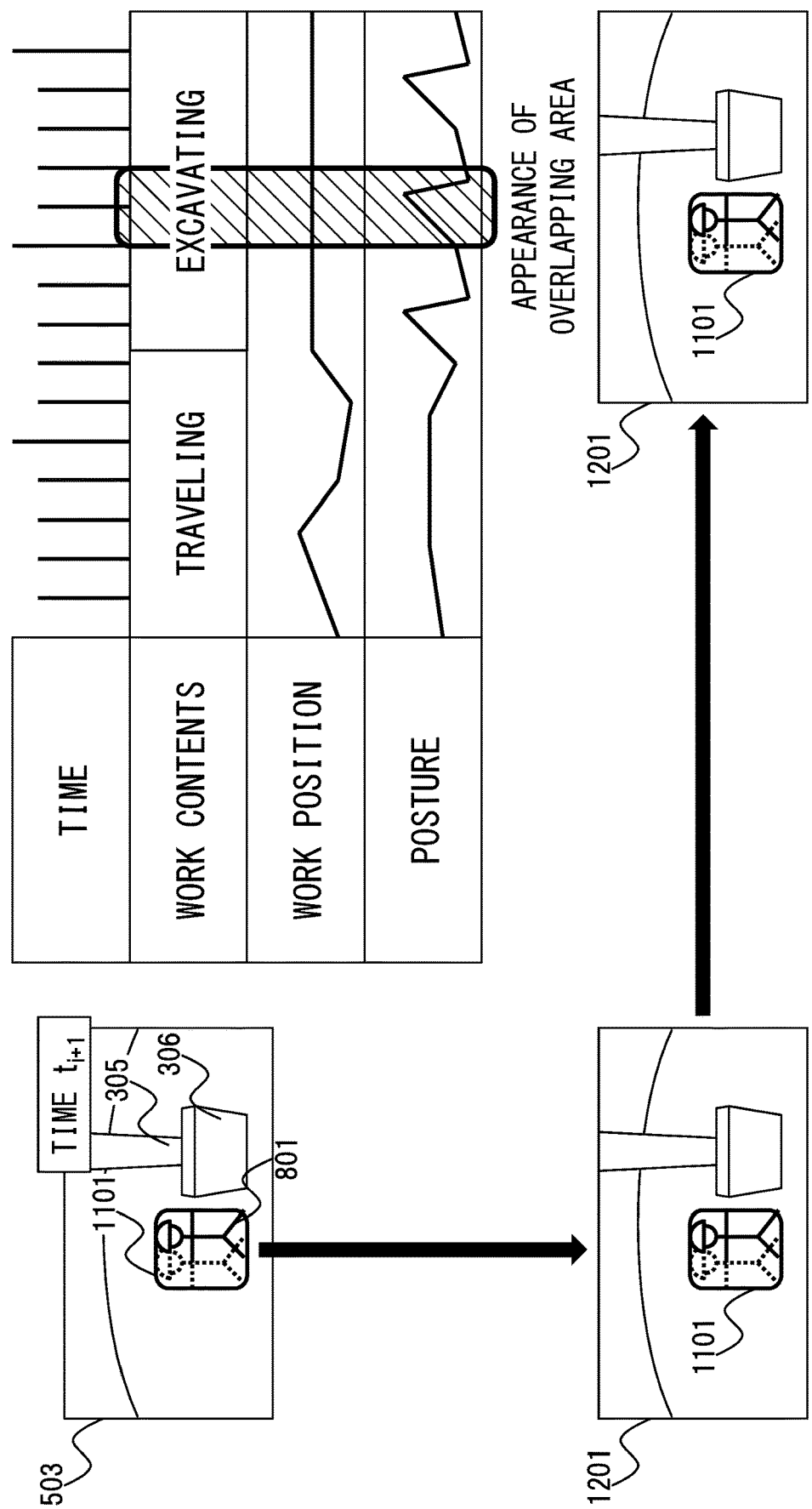
FIG. 12 is a view depicting display contents of a display device in a third embodiment of the present invention.

An example of the front camera image 503 at time ti+1 in the present embodiment is depicted at an upper left portion in FIG. 12. Here, a difference area 1101 at time ti+1 appears as a result of a movement of the person 801 at time ti+1. In a case where it is decided by a subsequent process that the overlapping area 802 has appeared, the difference area 1101 at time ti+1 and a camera image 1201 at time ti+1 are recorded into the recording device 109. Since camera images are used for calculation of the overlapping area 802 and the difference area 1101, in such a situation as just described, the camera image 1201 and the difference area 1101 are recorded into the recording device 109 without fail.

An example of a display image on the screen of the display device 110 in the present example is depicted on the right side in FIG. 12. At time at which the overlapping area 802 exists, the camera image 1201 and the difference area 1101 recorded in the recording device 109 are displayed together with a highlighted image of appearance of an overlapping area.

In the present embodiment, the controller 100 places, when deciding that the excavator 301 and the object 801 are close to each other, information about the difference area 1101 indicative of a range in which the object 801 has moved in an image capturing interval of the cameras 501 and 502 in an image captured by the camera 501 and 502 at the time of decision and the images captured by the cameras 501 and 502 at the time of decision, into the operation information and outputs the resulting operation information.

According to the present embodiment configured in such a manner as described above, when an overlapping area 802 appears, together with the difference area 1101 that has been made a decision criterion of the appearance, a situation around the difference area 1101 can be displayed as an image. Thus, the system user can visually recognize in what situation the overlapping area 802 has appeared. The system user can grasp the significance of analysis of the overlapping area 802 on the basis of the contents of the visual recognition and execute subsequent countermeasures rapidly.

Fourth Embodiment

The present embodiment described below is directed to an example in which object sensing is performed using a LiDAR (Light Detection and Ranging).

Figure 13:
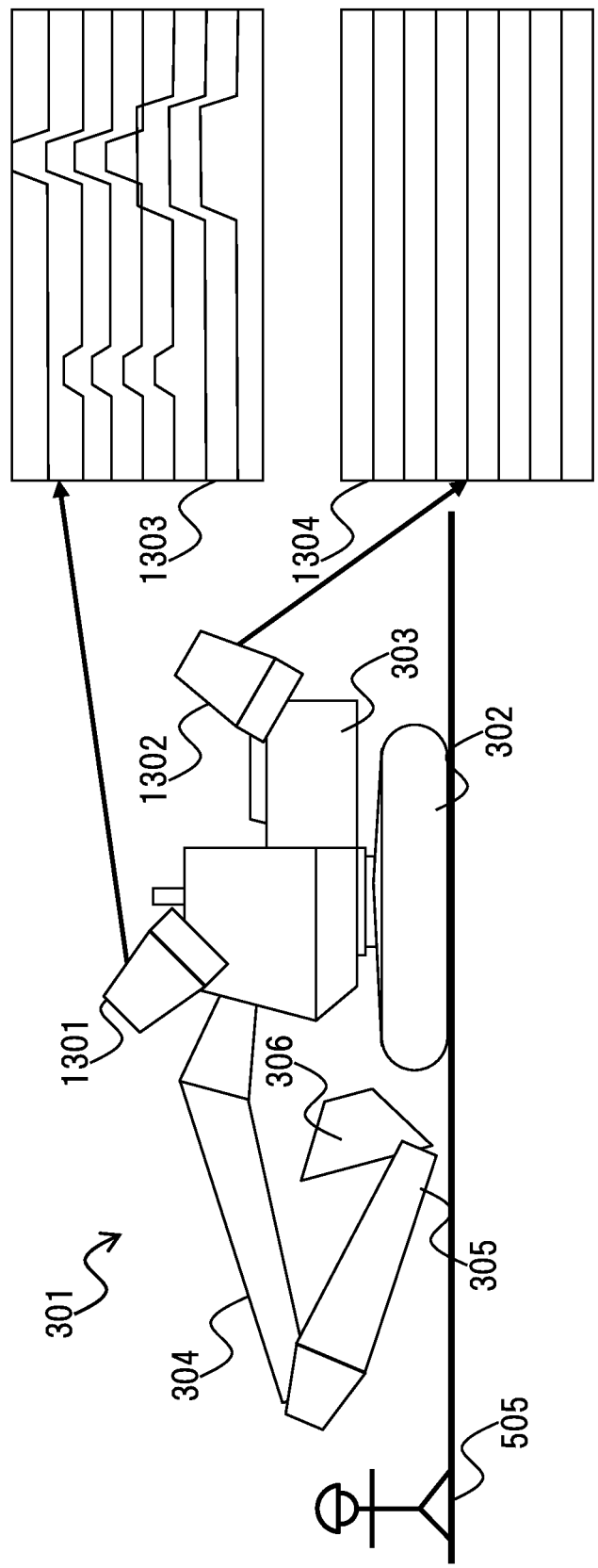
FIG. 13 is a view illustrating a detection process by a LiDAR in a fourth embodiment of the present invention.

A configuration of the excavator 301 in the present embodiment is depicted in FIG. 13. In this configuration, the cameras 501 and 502 in the first embodiment are replaced with LiDARs. In this example, a front LiDAR 1301 whose sensing target is the front of the excavator 301 and a rear LiDAR 1302 whose sensing target is the rear of the excavator 301 are installed.

A front LiDAR output 1303 and a rear LiDAR output 1304 are depicted on the right side in FIG. 13. The person 505, arm 305, and bucket 306 exist in the sensing range of the front LiDAR 1301, and thus waveforms are generated on the graph of the front LiDAR output 1303. The waveforms on the left side originate from the person 505, and the waveforms on the right side originate from the arm 305 and the bucket 306. It is to be noted that a target other than the ground surface does not exist in the sensing range of the rear LiDAR 1302, and except this, a characteristic waveform does not exist on the rear LiDAR output 1304.

The object sensing section 113 performs object sensing using such LiDAR outputs. As a result, the person 505, arm 305, and bucket 306 are sensed. On the basis of this result, the arrangement state decision section 115 excludes the waves originating from the arm 305 and the bucket 306 from comparison with the three-dimensional shape of the excavator 301 outputted from the arrangement calculation section 112 to acquire a waveform originating from the person 505. Calculation of the overlapping area 802 is performed using a result of the acquisition.

In the present embodiment, the object sensor 111 is the LiDARs 1301 and 1302 that acquire information about a distance to a target, and the controller 100 acquires the information about the distance to the object 505 by excluding the information about the distance to the machine body 301 from the information about the distance to the target acquired by the LiDARs 1301 and 1302.

According to the present embodiment configured in such a manner as described above, even in a case where the object sensor 111 is configured from the LiDARs 1301 and 1302, a decision result of whether or not the excavator 301 and the object 505 existing around the excavator 301 are close to each other is recorded together with the operation information similarly as in the first embodiment. Therefore, the system user can rapidly extract, from within a huge amount of operation information, work contents when the excavator 301 and the object 505 existing around the excavator 301 come close to each other can be extracted rapidly. Consequently, the verification efficiency of the work situation of the excavator 301 can be improved.

Fifth Embodiment

The present embodiment described below is directed to an example in which object sensing is performed using LiDARs and camera images upon object sensing are displayed.

Figure 14:
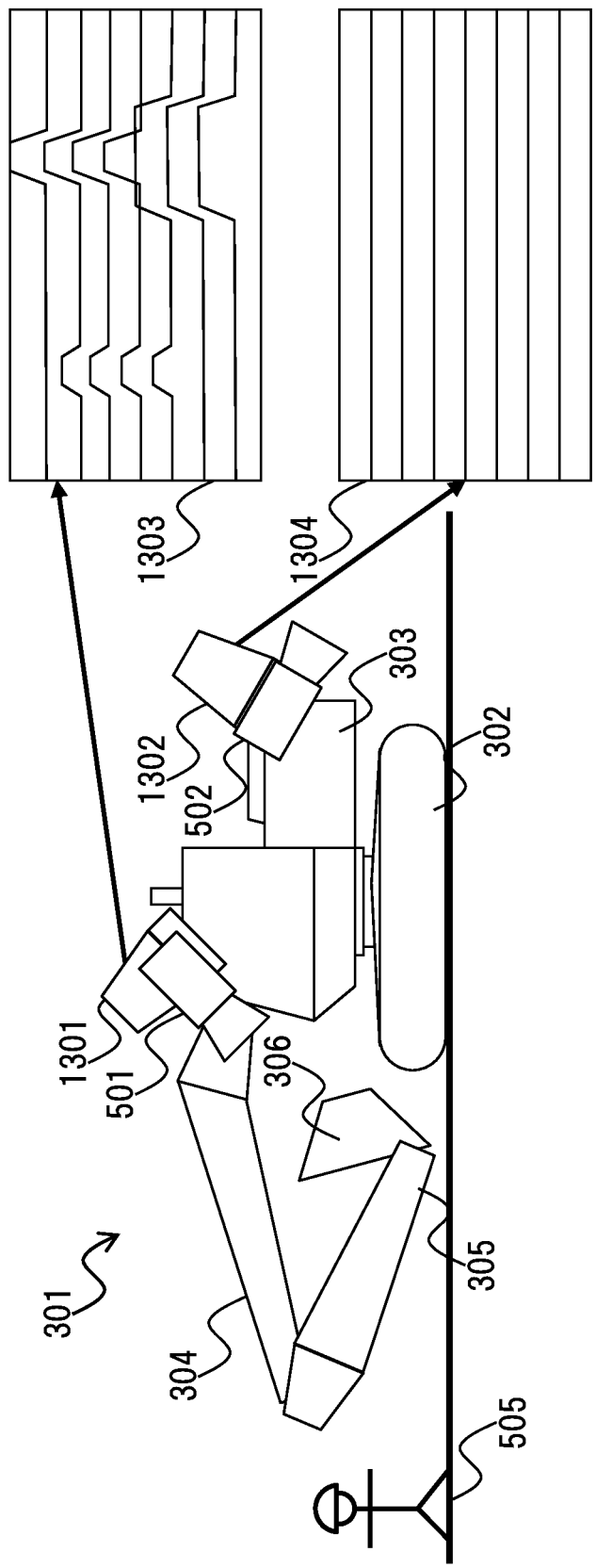
FIG. 14 is a view illustrating a detection process by a LiDAR in a fifth embodiment of the present invention.
Figure 15:
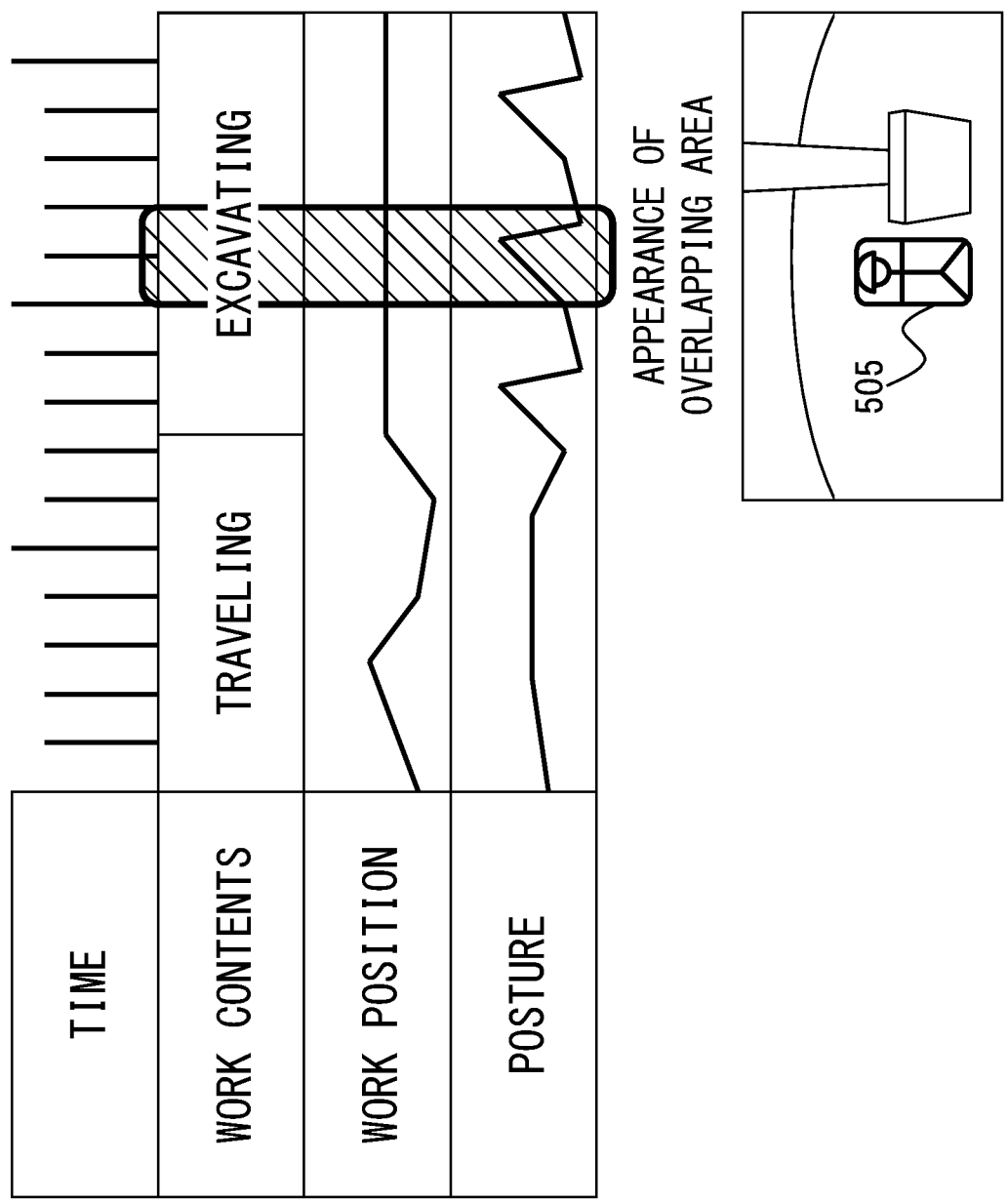
FIG. 15 is a view depicting display contents of a display device in the fifth embodiment of the present invention.

A configuration of the excavator 301 in the present embodiment is depicted in FIG. 14. In this configuration, LiDARs are installed in addition to the cameras 501 and 502 and the outputs of the LiDARs are inputted to the object sensing section 113. A detection process performed using the front LiDAR 1301 and the rear LiDAR 1302 is similar to that in the fourth embodiment. In the present embodiment, the front camera 501 and the rear camera 502 further capture images around the excavator 301. An object sensing result using the LiDAR outputs is superposed on the contents of the images captured by the cameras 501 and 502, and a result of this is recorded into the recording device 109. A display image of the display device 110 in this case is such as depicted in FIG. 15. At time at which appearance of an overlapping area 802 is sensed, the images recorded in the recording device 109 are displayed together.

In the present embodiment, the object sensor 111 is the LiDARs 1301 and 1302 that acquire information about a distance to a target, and the controller 100 acquires the information about the distance to the object 505 by excluding the information about the distance to the excavator 301 from the information about the distance to the target acquired by the LiDARs 1301 and 1302. The operation record analysis system for a construction machine according to the present embodiment further includes the cameras 501 and 502 that capture images around the excavator 301, and the controller 100 places, in a case where it decides that the excavator 301 and the object 505 are close to each other, the images captured by the front cameras 501 and 502 at the time of the decision, into the operation information and outputs the resulting operation information.

According to the present embodiment configured in such a manner as described above, when an overlapping area 802 appears, it is possible to display, together with an object sensing result that has been made a criterion of decision of the appearance, a situation around the object as an image, and it is possible for the system user to visually recognize in what situation the overlapping area 802 appears. The system user can grasp the significance of analysis of the overlapping area 802 on the basis of the visually recognized contents and execute subsequent countermeasures rapidly.

Although the embodiments of the present invention have been described in detail, the present invention is not restricted to the embodiments described above and include various modifications. For example, the embodiments described above have been described in detail in order to describe the present invention so as to facilitate understandings of the present invention and the present invention is not necessarily restricted to such embodiments that include all configurations described above. Also it is possible to add part of the configurations of a certain embodiment to the configurations of a different embodiment, or also it possible to delete part of the configurations of a certain embodiment or replace part of the configurations of a certain embodiment with part of a different embodiment.

DESCRIPTION OF REFERENCE CHARACTERS

100: Controller
101: Machine body position sensor
102: Machine body posture sensor
103: Operation state sensor
104: Work position acquisition section
105: Operation state acquisition section
106: Work contents estimation section
107: Operation information calculation section
108: Communication device
109: Recording device
110: Display device
111: Object sensor
112: Arrangement calculation section
113: Object sensing section
114: Shape information retaining section
115: Arrangement state decision section
201 to 219: Step
301: Excavator (machine body)
302: Lower track body
303: Upper swing structure
304: Boom
305: Arm
306: Bucket
501: Front camera (object sensor)
502: Rear camera (object sensor)
503: Front camera image
504: Rear camera image
505: Person (object)
601: Difference area
701: Person (object) at time ti
801: Person (object) at time ti+1
802: Overlapping area
803: Person movement range (object movement range)
804: Excavator movement range (machine body movement range)
1101: Difference area at time ti+1
1201: Camera image at time ti+1
1301: Front LiDAR (object sensor)
1302: Rear LiDAR (object sensor)
1303: Front LiDAR output
1340: Rear LiDAR output

The invention claimed is:

1. An operation record analysis system for a construction machine comprising:
a machine body including a front work implement having at least an arm and a bucket;
a machine body position sensor that senses a position of the machine body;
a machine body posture sensor that senses a posture of the machine body;
an operation state sensor that senses an operation state of the machine body; and
a controller configured to calculate a work position of the machine body on a basis of information from the machine body position sensor and the machine body posture sensor, estimate a type of work of the machine body on a basis of the work position and the operation state, and calculate operation information including the work position and the type of work,
wherein the operation record analysis system further comprises:
a recording device that records the operation information;
a display device that displays the operation information; and
an object sensor that senses an object existing around the machine body, and
wherein the controller is configured to:
calculate a position of the object on a basis of information from the object sensor,
decide, on a basis of the information from the machine body position sensor and the machine body posture sensor and the position of the object, whether the machine body and the object are close to each other,
add a result of the decision to the operation information at this point of time, and
record the operation information, to which the result of the decision is added, to the recording device to allow the operation information, to which the result of the decision is added, to be displayed on the display device.

2. The operation record analysis system for a construction machine according to claim 1,
wherein the object sensor is a camera that captures an image around the machine body, and
wherein the controller is configured to decide that the machine body and the object are close to each other in a case where at least part of a machine body movement range in which the machine body may possibly move in an image capturing interval of the camera and at least part of an object movement range in which the object may possibly move in the image capturing interval overlap with each other.

3. The operation record analysis system for a construction machine according to claim 2,
wherein the controller is configured to, in a case of deciding that the machine body and the object are close to each other, calculate the operation information including information about a difference area indicative of a range in which the machine body has moved in the image capturing interval in an image captured by the camera at the time of decision.

4. The operation record analysis system for a construction machine according to claim 2,
wherein the controller is configured to, in a case of deciding that the machine body and the object are close to each other, calculate the operation information including an image captured by the camera at the time of decision.

5. The operation record analysis system for a construction machine according to claim 1,
wherein the object sensor is a LiDAR that acquires information about a distance to a target, and
wherein the controller is configured to acquire information about a distance to the object by excluding information about a distance to the machine body from the information about the distance to the target acquired by the LiDAR.

6. The operation record analysis system for a construction machine according to claim 5,
wherein the operation record analysis system further comprises a camera that captures an image around the machine body, and
wherein the controller is configured to, in a case of deciding that the machine body and the object are close to each other, calculate the operation information including an image captured by the camera at the time of decision.

7. The operation record analysis system for a construction machine according to claim 1,
wherein the operation record analysis system further comprises a communication device that transmits the operation information.

* * * * *